United States Patent
Ramesh

(10) Patent No.: US 6,346,285 B1
(45) Date of Patent: *Feb. 12, 2002

(54) ARTICLE COMPRISING FILM HAVING POLYAMIDE SEALANT, POLYAMIDE CORE LAYER, AND $O_2$-BARRIER LAYER, AND PACKAGED PRODUCT USING SAME

(75) Inventor: Ram K. Ramesh, Greenville, SC (US)

(73) Assignee: Cryovac, Inc., Duncan, SC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,187

(22) Filed: Oct. 30, 1997

Related U.S. Application Data

(63) Continuation of application No. 08/698,833, filed on Aug. 16, 1996, now abandoned.

(51) Int. Cl.[7] .......................... A23L 1/31; A22C 13/00; B32B 1/08; B32B 27/34
(52) U.S. Cl. .................. 426/105; 428/34.8; 428/36.91; 428/213; 428/474.4; 428/474.9; 428/474.7; 383/94; 383/113
(58) Field of Search ............................. 428/36.9, 36.91, 428/34.8, 213, 474.7, 474.9, 474.4; 383/93, 94, 109, 113; 426/105

(56) References Cited

U.S. PATENT DOCUMENTS

| | | | |
|---|---|---|---|
| 3,762,986 A | 10/1973 | Bhuta et al. | 161/227 |
| 4,064,296 A | 12/1977 | Bornstein et al. | 428/35 |
| 4,098,860 A | 7/1978 | Etou et al. | 264/171 |

(List continued on next page.)

FOREIGN PATENT DOCUMENTS

| | | |
|---|---|---|
| DE | 90 07 334.7 | 4/1991 |
| EP | 0170385 | 6/1985 |

(List continued on next page.)

OTHER PUBLICATIONS

Kroschwitz, J. and M. Howe–Grant, Encyclopedia of Chemical Technology, 4th Edition, vol. 19, p. 504, 1996.*
Journal of Polymer Science, vol. 20, pp 441–445, 1982, L. Wild et al., "Determination of Branching Polyethylene and Ethylene Copolymers".
1990 Annual Book of ASTM Standards, vol. 8.02, pp 368–371, "Standard Test Method for Unrestrained Linear Thermal Shrinkage of Plastic Film and Sheeting".

Primary Examiner—Stevan A. Resan
Assistant Examiner—Holly C. Rickman
(74) Attorney, Agent, or Firm—Rupert B. Hurley, Jr.

(57) ABSTRACT

An article, such as a bag, pouch, or casing, is made from a multilayer film which has: (a) a first layer, which is an outer film layer, comprising a polyamide having a melting point of from about 250° F. to 400° F., the first layer having a thickness of less than about 18 percent, based on a total thickness of the multilayer film; (b) a second layer comprising at least one member selected from the group consisting of polyamide 6, polyamide 9, polyamide 10, polyamide 11, polyamide 12, polyamide 66, polyamide 610, polyamide 612, polyamide 6I, polyamide 6T, polyamide 69, and copolymers thereof, the second layer having a thickness of from about 3 to 30 percent of the total thickness of the multilayer film; and (c) a third layer which serves as an $O_2$-barrier layer and comprises at least one member selected from the group consisting of ethylene/vinyl alcohol copolymer, and polyvinylidene chloride. The first layer of the film is sealed to itself. The article is suitable for use as a packaging film to be used for cook-in end use. The film provides the article with enhanced sealing and toughness properties The invention also includes a packaged product comprising the multilayer film.

31 Claims, 5 Drawing Sheets

U.S. PATENT DOCUMENTS

| | | | | |
|---|---|---|---|---|
| 4,120,928 A | | 10/1978 | Furukawa et al. | 264/171 |
| RE30,390 E | | 9/1980 | Kupeikevicius et al. | 17/49 |
| 4,302,565 A | | 11/1981 | Goeke et al. | 526/88 |
| 4,302,566 A | | 11/1981 | Karol et al. | 526/125 |
| 4,486,507 A | | 12/1984 | Schumacher | 428/476 |
| 4,495,751 A | | 1/1985 | Galbiati | 53/576 |
| 4,501,798 A | | 2/1985 | Koschak | 428/349 |
| 4,568,580 A | * | 2/1986 | Ghirardello et al. | 428/35 |
| 4,606,922 A | | 8/1986 | Schirmer | 426/412 |
| 4,612,221 A | | 9/1986 | Biel et al. | 428/35 |
| 4,647,483 A | | 3/1987 | Tse et al. | 428/35 |
| 4,659,599 A | | 4/1987 | Strutzel | 428/36 |
| 4,683,170 A | | 7/1987 | Tse et al. | 428/349 |
| 4,851,245 A | | 7/1989 | Hisazumi et al. | 426/105 |
| 4,855,183 A | | 8/1989 | Oberle | 428/345 |
| 4,892,765 A | * | 1/1990 | Hisazumi et al. | 428/34.8 |
| 4,937,112 A | | 6/1990 | Schirmer | 428/34.3 |
| 4,944,970 A | | 7/1990 | Stenger et al. | 428/34.8 |
| 5,077,109 A | | 12/1991 | Lustig et al. | 428/36.91 |
| 5,079,051 A | | 1/1992 | Garland et al. | 428/34.9 |
| 5,085,891 A | | 2/1992 | Niaura et al. | 427/149 |
| 5,094,799 A | | 3/1992 | Takashige et al. | 264/514 |
| 5,185,189 A | | 2/1993 | Stenger et al. | 428/34.8 |
| 5,206,075 A | | 4/1993 | Hodgson, Jr. | 428/216 |
| 5,213,900 A | * | 5/1993 | Friedrich | 428/474.4 |
| 5,241,031 A | | 8/1993 | Mehta | 526/348.1 |
| 5,272,236 A | | 12/1993 | Lai et al. | 526/348.5 |
| 5,278,272 A | | 1/1994 | Lai et al. | 526/348.5 |
| 5,418,068 A | | 5/1995 | Caluori et al. | 428/474.4 |
| 5,425,974 A | * | 6/1995 | Von Widdern et al. | 428/354 |
| 5,480,690 A | * | 1/1996 | Strenger et al. | 428/35.8 |
| 5,547,765 A | * | 8/1996 | Degrassi et al. | 428/474.7 |
| 5,863,643 A | * | 1/1999 | Von Widdern et al. | 428/220 |

FOREIGN PATENT DOCUMENTS

| | | |
|---|---|---|
| EP | 0325151 | 1/1989 |
| EP | 0331509 | 3/1989 |
| EP | 0358038 | 8/1989 |
| EP | 0408390 | 7/1990 |
| EP | 0465931 | 1/1992 |
| EP | 0 720 910 | 7/1996 |
| JP | 93-096662 | 8/1991 |
| JP | 93-348006 | 3/1992 |
| WO | WO 90/03414 | 4/1990 |
| WO | WO 92/15641 | 9/1992 |
| WO | WO 93/03093 | 2/1993 |

\* cited by examiner

ARTICLE COMPRISING FILM HAVING POLYAMIDE SEALANT, POLYAMIDE CORE LAYER, AND O₂-BARRIER LAYER, AND PACKAGED PRODUCT USING SAME

This application is a continuation, of application Ser. No. 08/698,833 filed Aug. 16, 1996 now abandoned.

FILE OF THE INVENTION

The present invention relates to articles made from the conversion of multilayer films, and particularly to such articles which are suitable for packaging meat products, especially for the cook-in packaging of meat products wherein the film has a food contact surface which adheres to the meat during cook-in.

BACKGROUND OF THE INVENTION

For several years, the food packaging industry has utilized a packaging film from which bags and casings have been made which are of improved structural soundness such that they have been fully characterized as cook-in. A precooked food product has been attractively packaged using a film within which the product was precooked. The film has been used primarily for cook-and-ship end-use, wherein a meat product is packaged in the film and cooked while in the film, and is thereafter cooled and shipped to wholesaler, retailer, or consumer, without being overwrapped and without having the film stripped therefrom and thereafter being re-packaged in another film.

The phrase "cook-in" as used herein refers to the process of cooking a product packaged in a material capable of withstanding exposure to long and slow cooking conditions while containing the food product, for example cooking at 57° C. to 121° C. (i.e, 135° F.–250° F.) for 2–12 hours, preferably 57° C. to 95° C. (i.e 135° F.–203° F.) for 2–12 hours. Cook-in packaged foods are essentially pre-packaged, pre-cooked foods which may be directly transferred to the consumer in this form. These types of foods may be consumed with or without warming. Cook-in packaging materials maintain seal integrity, i.e., any heat sealed seams should resist being pulled apart during cook-in, and are conformable to the contained food product. Preferably, conformability is achieved by the film being heat shrinkable so as to form a tightly fitting package. Additional optional characteristics of films for use in cook-in applications include delamination-resistance, low O₂-permeability, heat-shrinkability, and optical clarity.

Cook-in films preferably have a tendency for adhesion to the food product, thereby preventing "cook-out", i.e., "purge", which is the collection of juices between the outer surface of the food product and the meat-contact surface of the film, i.e., the surface in direct contact with the meat. This meat adhesion characteristic of the meat contact layer serves to both prevent cook-out (and thereby prevent an unattractive package or the need to strip the film from the meat and repackage the meat), to increase product yield, and to prevent the meat from losing juices which improve its edible character. As used herein, the term "adhere", with respect to meat-adhesion, refers to a meat-contact surface of the film which bonds during cook-in to the contained food product to an extent sufficient to substantially prevent accumulation of fluids between the film and the contained meat product.

However, some of the cook-in films in commercial use have an outer layer which serves as a meat-adhesion layer, this layer containing a relatively large amount of one or more relatively expensive polyamides. In one commercially available film, for example, this outer polyamide layer typically comprised a blend of polyamide 12 and polyamide 6/12, both of which are relatively expensive but which provide advantageous sealing and meat adhesion performance. It has been believed that these polyamide polymers must be present in a relatively thick outer layer (e.g., about 20% of the total film thickness), in order to provide the seal performance during cook-in, because the converted articles typically need to survive cooking for long periods of time at high temperatures, e.g., cooking the meat product at 190° F. for 6–12 hours. It would be desirable to reduce the cost of the film if the seal quality and meat-adhesion could be maintained, or at least not sacrificed to any significant degree.

SUMMARY OF THE INVENTION

In comparison with prior art commercially-available films, the article of the present invention utilizes a film which contains less costly polymer, while providing comparable performance characteristics, i.e., comparable seal strength, comparable meat adhesion, and comparable package appearance. Furthermore, in some cases this film can provide the further advantage of downgauging of the total film thickness, so that less total polymer is required. Furthermore, in some cases the film of the present invention can be used to provide an enhanced level of shrink tension. In some cases, the film of the present invention can provide enhanced toughness/abuse resistance even though the thickness of the film is not increased over other films which have previously been used. Surprisingly, the film of the present invention can provide comparable performance characteristics even if it has a thickness less than the cook-in films which have been in commercial use. In addition, the film of the invention exhibits improved heat seal strength relative to prior art commercially-available films having, for example, ionomer meat contact layers. The film of the present invention is suitable for the packaging of a wide variety of food products, especially meat products.

As a first aspect, the present invention is directed to an article comprising a multilayer film. The multilayer film comprises: (A) a first layer comprising a polyamide having a melting point of from about 250° F. to 400° F., the first layer having a thickness of less than about 18 percent, based on a total thickness of the multilayer film; (B) a second layer comprising at least one member selected from the group consisting of polyamide 6, polyamide 9, polyamide 10, polyamide 11, polyamide 12, polyamide 66, polyamide 610, polyamide 612, polyamide 6I, polyamide 6T, polyamide 69, and copolymers thereof, the second layer having a thickness of from about 3 to 30 percent of the total thickness of the multilayer film; and; and (C) a third layer which serves as an O₂-barrier layer and comprises at least one member selected from the group consisting of ethylene/vinyl alcohol copolymer, polyamide, polyvinylidene chloride, and polyalkylene carbonate. The first layer is sealed to itself. Preferably, the first layer has a thickness of from about 0.5 to 18 percent of the total film thickness; more preferably, from about 5 to 18 percent; still more preferably, from about 6 to 15 percent; and, yet still more preferably, from about 8 to 12 percent. Preferably, the polyamide in the first layer has a melting point of from about 300° to 375° F. Preferably, the second layer has a thickness of from about 3 to 30 percent of the total film thickness; more preferably, from about 4 to 20 percent; still more preferably, from about 5 to 10 percent. Preferably, the second layer is directly adhered to the first layer. Preferably, the second layer comprises at least one member selected from the group consisting of polyamide 6, polyamide 66, and polyamide 6/66.

In a first preferred embodiment, the first layer comprises only one polyamide. In a second preferred embodiment, the first layer comprises copolyamide 6/12 in an amount of from about 20 to 80 weight percent, and polyamide 12 in an amount of from about 80 to 20 weight percent. In either embodiment, the first layer preferably has a thickness of less than about 15 percent, based on a total thickness of the multilayer film. In either embodiment, preferably the first layer has a thickness of from about 0.2 to 0.4 mil.

Preferably, the second layer comprises polyamide 6 and at least one member selected from the group consisting of polyamide 66, polyamide 610, polyamide 6/12, polyamide 6I, polyamide 6T, polyamide 69, and copolyamides thereof. More preferably, the second layer comprises polyamide 6 in an amount of from about 40 to 90 weight percent, and polyamide 6/12 in an amount of from about 10 to 60 weight percent.

Preferably, the thickness of the second layer is from about 3 to 20 percent, based on a total thickness of the multilayer film; more preferably, the thickness of the second layer is less than about 15 percent, based on a total thickness of the multilayer film.

Preferably, the multilayer film further comprises a fourth layer comprising at least one member selected from the group consisting of polyolefin, polyamide, polyester, starch-containing polymer, polystyrene, and polyurethane. Preferably, the fourth layer comprises at least one member selected from the group consisting of polyethylene homopolymer, polyethylene copolymer, polypropylene homopolymer, polypropylene copolymer, polybutene homopolymer, and polybutene copolymer, and the fourth layer is an outer layer.

Preferably, the multilayer film further comprises a fifth layer between the third layer and the fourth layer, the fifth layer serving as a tie-layer. Preferably, the multilayer film further comprises a sixth layer between the first layer and the third layer, the sixth layer serving as a tie-layer.

Preferably, the multilayer film is biaxially oriented. Preferably, the multilayer film has a free shrink, at 185° F., of at least 10 percent in at least one direction.

Preferably, at least a portion of the multilayer film comprises a cross-linked polymer network.

As a second aspect, the present invention is directed to a bag comprising a multilayer film as in the first aspect of the present invention. Preferably, the bag is an end-seal bag or a side seal bag. Preferably, the multilayer film in the bag is a preferred multilayer film in accordance with the first aspect of the present invention.

As a third aspect, the present invention is directed to a packaged product comprising a package and a product in the package. The package comprises the multilayer film as set forth in the first aspect of the present invention. The product comprises cooked meat. Preferably, the multilayer film in the package is a preferred multilayer film in accordance with the first aspect of the present invention. Preferably, the cooked meat product comprises at least one member selected from the group consisting of poultry, ham, roast beef, liver sausage, mortadella, bologna, goat, and lamb. More preferably, the cooked meat product comprises at least one member selected from the group consisting of poultry, ham, and roast beef.

DETAILED DESCRIPTION OF THE INVENTION

Figure 1:
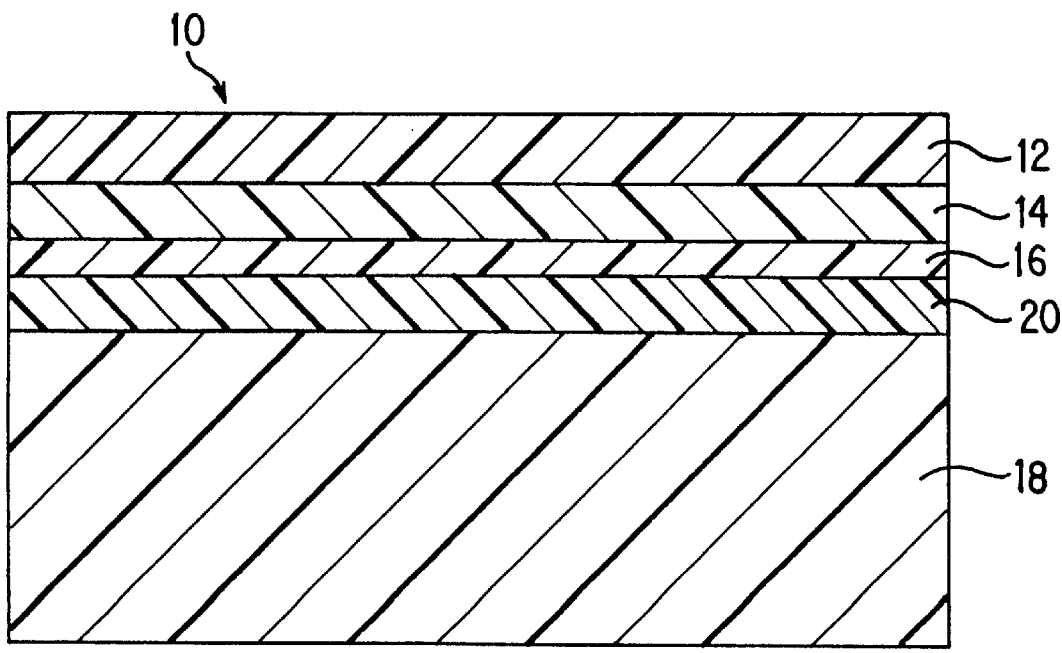
FIG. 1 illustrates an enlarged cross-sectional view of a preferred 5-layer multilayer film suitable for use in the article according to the present invention.

As used herein, the phrase "lay-flat film" refers to a film that has been extruded as a wide, thin-walled, circular tube, usually blown, cooled, then gathered by converging sets of rollers and wound up in flattened form. The phrase "lay-flat width", refers to half of the circumference of the inflated film tube.

As used herein, the phrase " . . . a layer comprising . . . a polyamide having a melting point . . . " refers to a film layer containing at least one polyamide, the polyamide having a melting point within the specified temperature range.

The article of the present invention is preferably a bag, thermoformed package portion, or other converted film product. Preferably, the first layer serves as both a seal layer and a food-contact layer.

As used herein, the term "film" is used in a generic sense to include plastic web, regardless of whether it is film or sheet. Preferably, films of and used in the present invention have a thickness of 0.25 mm or less. As used herein, the term "package" refers to packaging materials configured around a product being packaged. The phrase "packaged product," as used herein, refers to the combination of a product which is surrounded by a packaging material.

As used herein, the term "seal" refers to any seal of a first region of a film surface to a second region of a film surface, wherein the seal is formed by heating the regions to at least their respective seal initiation temperatures. The sealing can be performed by any one or more of a wide variety of manners, such as using a heated bar, hot air, hot wire, infrared radiation, ultrasonic sealing, radio frequency sealing, etc. However, the preferred sealing mechanism is a seal made on a bag machine using a hot-wire.

As used herein, the phrases "food-contact layer" and "meat-contact layer" refer to a layer of a multilayer film which is in direct contact with the food/meat in the package comprising the film. In a multilayer film, a food-contact layer is always an outer film layer, as the food-contact layer is in direct contact with the food product within the package. The food-contact layer is an inside layer in the sense that with respect to the packaged food product, the food-contact layer is the inside layer (i.e., innermost layer) of the package, this inside layer being in direct contact with the food. As used herein, the phrases "food-contact surface" and "meat-contact surface" refer to an outer surface of a food contact layer, this outer surface being in direct contact with the food within the package.

As used herein, the phrases "meat-adhesion," "film-to-meat adhesion," "film-to-food adhesion," and "adhered", refer to maintaining direct contact between the meat surface and the meat-contact surface of the film, so that there is an absence of a substantial amount of free moisture, i.e., purge, which is water and juices emitted outside of the food/meat product. In general, there is an absence of a substantial amount of free moisture if the level of free moisture is from about 0 to 2%, based on the weight of the meat product before cooking. Preferably the amount of free moisture is from about 0 to 1%, more preferably, 0 to 0.5%, and still preferably from 0 to 0.01 percent based on the weight of the meat product before cooking.

As used herein, the phrase "meat pull-off" refers to that portion of a cook-in meat product which is torn off of the meat product upon stripping the cook-in film from the cooked meat product.

As used herein, the term "ham," and the phrase "ham products," include the following categories known to those of skill in the art: ham with natural juices, ham with water added, and, ham-and-water product. The ham with natural juices comprises at least 17½% protein fat-free [PFF], while the ham with water added comprises at least 16% protein fat-free. The ham-and-water product, on the other hand, comprises at least 16% protein fat-free, but also comprises added ingredients in an amount of about 35 weight percent, based on the weight of the product. Due to the relatively high percentage of added ingredients in the ham-and-water product, it is much more difficult to obtain adequate film-to-meat adhesion to the ham-and-water product than to the other above-identified ham products. The above description of ham products are known to those of skill in the art, and moreover, are disclosed in the Encyclopedia of Labeling Meat and Poultry Products, Eighth Edition, Meat Plant Magazine, St. Louis, Mo.

As used herein, the phrase "cook-in" refers to the process of cooking a product packaged in a material capable of withstanding exposure to long and slow cooking conditions while containing the food product, for example submersion in water at 57° C. to 121° C. (i.e, 135° F.–250° F.) for 2–12 hours, preferably 57° C. to 100° C. (i.e, 135° F.–250° F.) for 2–12 hours. Cook-in packaged foods are essentially pre-packaged, precooked foods which may be directly transferred to the consumer in this form. These types of foods may be consumed with or without warning. Cook-in packaging materials maintain seal integrity, and in the case of multilayer films are delamination resistant. Cook-in films must also be heat shrinkable under cook-in conditions so as to form a tightly fitting package. Cook-in films preferably have a tendency for adhesion to the food product, thereby preventing "cook-out", which is the collection of juices between the outer surface of the food product and the meat-contact surface of the film, i.e., the surface in direct contact with the meat. Additional optional characteristics of films for use in cook-in applications include delamination-resistance, low $O_2$-permeability, heat-shrinkability representing about 20–50% biaxial shrinkage at about 85° C. (185° F.), and optical clarity. For hermetically sealed bags, it is preferred that the external surface of the package is subjected to a temperature of at least about 150° F.; preferably from about 150° F. to 212° F.; more preferably, from about 160° to 212° F.; still more preferably, from about 165° F. to 200° F.; and, even yet still more preferably, from about 170° F. to 180° F.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably from about 50 to 100 mole percent; more preferably, from about 85 to 100 mole percent.

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride, polyamide, polyester, polyacrylonitrile, etc., as known to those of skill in the art.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality.

As used herein, the terms "lamination," "laminate," as well as the phrase "laminated film," refer to the process, and resulting product, made by bonding together two or more layers of film or other materials. Lamination can be accomplished by joining layers with adhesives, joining with heat and pressure, with corona treatment, and even spread coating and extrusion coating. The term laminate is also inclusive of coextruded multilayer films comprising one or more tie layers.

As used herein, the term "oriented" refers to a polymer-containing material which has been elongated (generally at an elevated temperature called the orientation temperature), followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the film. Upon subsequently heating unrestrained, unannealed, oriented polymer-containing material to its orientation temperature, heat shrinkage is produced almost to the original dimensions, i.e., pre-elongation dimensions. The term "oriented," is herein used with reference to oriented films, which can undergo orientation in any one or more of a variety of manners.

Orienting in one direction is referred to herein as "uniaxial orientation," while orienting in two directions is referred to herein as "biaxial orientation." In oriented plastic films, there can be internal stress remaining in the plastic sheet which can be relieved by reheating the film to a temperature above that at which it was oriented. Upon reheating such a film, the film tends to shrink back to the original dimensions it had before it was oriented. Films which shrink upon being heated are generally referred to as heat-shrinkable films.

As used herein, the phrase "orientation ratio" refers to the multiplication product of the extent to which the plastic film material is oriented in several directions, usually two directions perpendicular to one another. Orientation in the machine direction is herein referred to as "drawing", whereas orientation in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, also known as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, tetrapolymers, etc. In general, the layers of a film can consist essentially of a single polymer, or can have additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. The term "copolymer" is also inclusive of, for example, the copolymerization of a mixture of ethylene, propylene, 1-hexene, and 1-octene. As used herein, the term "copolymerization" refers to the simultaneous polymerization of two or more monomers. The term "copolymer" is also inclusive of random copolymers, block copolymers, and graft copolymers.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, a copolymer identified in terms of a plurality of monomers, e.g., "propylene/ethylene copolymer", refers to a copolymer in which either monomer may copolymerize in a higher weight or molar percent hand the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/ alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, copolymers are identified, i.e, named, in terms of the monomers from which the copolymers are produced. For example, the phrase "propylene/ethylene copolymer" refers to a copolymer produced by the copolymerization of both propylene and ethylene, with or without additional comonomer(s). As used herein, the phrase "mer" refers to a unit of a polymer, as derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers can be used in various layers of multilayer films useful in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," may be determined by gel permeation chromatography. Homogeneous ethylene/ alpha-olefin copolymers which can be used in the present invention preferably have an $M_w/M_n$ of less than 2.7; more preferably from about 1.9 to 2.5; still more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers useful in the present invention also exhibit a relatively narrow melting point range, in comparison with "heterogeneous copolymers", i.e., polymers having a CDBI of less than 55%. Preferably, the homogeneous ethylene/alpha-oefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1octene, respectively. Most preferably, the alpha-olefin comprise octene-1, and/or a blend of hexene-1 and butene-1.

Processes for preparing and using homogeneous polymers are disclosed in U.S. Pat. No. 5,206,075, to HODGSON, Jr., U.S. Pat. No. 5,241,031, to MEHTA, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another species of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactamn with a comonomer which when polymerized alone does not result in the formation of a polyamide. Furthermore, terms identifying polymers are also inclusive of "blends" of such polymers with other polymers of a different type.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" refers to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrases "ethylene alpha-olefin copolymer", and "ethylene/alpha-olefin copolymer", refer to such heterogeneous materials as low density polyethylene (LDPE), medium density polyethylene (MDPE), linear low density polyethylene (LLDPE), and very low and ultra low density polyethylene (VLDPE and ULDPE); as well as to such homogeneous ethylene/alpha olefin copolymers as: metallocene-catalyzed EXACT (™) linear homogeneous ethylene/alpha olefin copolymer resins obtainable from the Exxon Chemical Company, of Baytown, Tex., homogeneous substantially linear ethylene/alpha-olefin copolymers having long chain branching (e.g., copolymers known as AFFINITY (™) resins, and ENGAGE (™) resins, available from the Dow Chemical Company, of Midland, Mich.), as well as TAFMER (™) linear homogeneous ethylene/alpha-olefin copolymer resins obtainable from the Mitsui Petrochemical Corporation. Both the heterogeneous polymers and homogeneous polymers referred to above generally include copolymers of ethylene with one or more comonomers selected from $C_4$ to $C_{10}$ alpha-olefin such as butene-1 (i.e., 1-butene), hexene-1, octene-1, etc. While LDPE and MDPE are more highly branched than LLDPE, VLDPE, ULDPE, EXACT (™) resin, and TAFMER (™) resin, this latter group of resins has a relatively large number of short branches rather than the longer branches present in LDPE and MDPE. AFFINITY (™) resins and ENGAGE (™) resins have a relatively large number of short branches in combination with a relatively small number of long-chain branches. LLDPE has a density usually in the range of from about 0.91 grams per cubic centimeter to about 0.94 grams per cubic centimeter.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "inside layer" refers to an outer film layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outer layer" refers to any film layer of film having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any inner film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrases "seal layer," "sealing layer," "heat seal layer," and "sealant layer," refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin, polyamide, polyester, and polyvinyl chloride.

As used herein, the phrase "tie layer" refers to any inner film layer having the primary purpose of adhering two layers to one another. Tie layers can comprise any polymer having a polar group thereon, or any other polymer which provides sufficient interlayer adhesion to adjacent layers comprising otherwise nonadhering polymers.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

The names "first layer", "second layer", as used herein, are generally indicative of the manner in which a multilayer film structure is built up. That is, in general, the first layer can be present without any of the additional layers described, or the first and second layers can be present without any of the additional layers described, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards*, Vol. 08.02, pp. 368–371, which is hereby incorporated, in its entirety, by reference thereto.

The multilayer films useful in the article and process of the present invention has at least 3 layers (preferably from 3 to 20 layers), and preferably has at least 4 layers (more preferably from 4 to 12 layers; still more preferably, from 4 to 11 layers; and yet still more preferably, from 6 to 10 layers). However, so long as the multilayer film has at least 3 layers, the multilayer film can have any further number of additional layers desired, so long as the film provides the desired properties for the particular packaging operation in which the film is used, e.g. $O_2$-barrier characteristics, free shrink, shrink tension, optics, modulus, seal strength, etc. The multilayer film illustrated in FIG. 1 comprises five layers; in FIG. 2, six layers; in FIG. 3, six layers.

The multilayer film used in the present invention can have any total thickness desired, so long as the film provides the desired properties for the particular packaging operation in which the film is used. Preferably, the film used in the present invention has a total thickness (i.e., a combined thickness of all layers), of from about 0.3 to 15 mils (1 mil equals 0.001 inch); more preferably, from about 1 to 10 mils; and still more preferably, from 1.5 to 8 mils. For shrinkable bags, the range from 1.5–3 mils is even more preferred while for non-shrinkable articles, the range of from 4–8 mils is even more preferred.

In FIG. 1, multilayer film 10 comprises outer layer 12. Used in the article of the present invention, outer layer 12 serves as an inside layer which is also a food-contact layer. Outer layer 12 is a "first layer" in a film used in accordance with the present invention.

In the present invention, preferably the first layer comprises a polyamide having a melting point of from about 260° F. to 400° F.; more preferably, from about 275 F. to 375° F.; still more preferably, from about 300 to 360° F.; and, yet still more preferably, from about 300 to345° F. Preferably, this polyamide comprises at least one member selected from the group consisting of copolyamide 6/12, polyamide 12, copolyamide 66/69/61, copolyamide 66/610, copolyamide 6/66, and copolyamide 6/69.

In one preferred embodiment, the polyamide in the first layer comprises at least one member selected from the group consisting of: (a) copolyamide 6/12 comprising (i) caprolactam mer in an amount of from about 20 to 80 weight percent, and (ii) laurolactam mer in an amount of from about 80 to 20 weight percent; (b) polyamide 12; (c) copolyamide 66/69/6I comprising 10 to 50 weight percent hexamethylene adipamide mer (more preferably, from about 20 to 40 weight percent); 10 to 50 weight percent polyamide 69 mer (more preferably, from about 20 to 40 weight percent); and, 10 to 60 weight percent hexamethylene isophthalamide mer (more preferably, from about 10 to 40 weight percent). Still more preferably, the polyamide in the first layer comprises a blend of 50% copolyamide 6/12, which preferably comprises about 50% caprolactam mer, and 50% polyamide 12.

Preferably, the first layer comprises only one polyamide; more preferably, the first layer consists of only one polyamide.

Preferably, the first layer has a thickness of from about 3 to 20 percent, based on the total thickness of the multilayer film; more preferably, from about 5 to 18 percent; still more preferably, from about 7 to 16 percent; yet still more preferably, from about 9 to 13 percent. Preferably, the first layer has a thickness of from about 0.05 to 2 mils; more preferably, from about 0.1 to 1 mil; still more preferably, from about 0.2 to 0.8 mil; yet still more preferably, from about 0.2 to 0.4 mil; and, even yet still more preferably, from about 0.2 to 0.3 mil.

In FIG. 1, multilayer film 10 further comprises inner layer 14. Inner layer 14 is a "second layer" in a film used in accordance with the present invention.

In the present invention, the polyamide in the second layer prefereably comprises at least one member selected from the group consisting of polyamide 6, polyamide 9, polyamide 10, polyamide 11, polyamide 12, polyamide 66, polyamide 610, polyamide 612, polyamide 6I, polyamide 6T, polyamide 69, and copolymers thereof; more preferably the polyamide in the second layer comprises at least one member selected from the group consisting of polyamide 6, 66 and 6/66. Preferably, the polyamide in the second layer has a melting point of at least 350° F.; more preferably, at least 370° F. and even more preferably, at least 390° F.

Preferably, the second layer further comprises a polymer which retards the crystallization of the polyamide in the second layer. Preferably, this (crystallization-retarding) polymer comprises at least one member selected from the group consisting of polyolefin and third polyamide. Preferably, the polyolefin comprises at least one member selected from the group consisting of ethylene/unsaturated acid copolymer, ethylene/unsaturated ester copolymer, and modified polyolefin. Preferably, the third polyamide has a crystal structure different from the polyamide in the second layer of the multilayer film.

More particularly, the second film layer preferably comprises a blend of polyamide 6 with a third polyamide comprising at least one member selected from the group consisting of polyamide 9, polyamide 10, polyamide 11, polyamide 12, polyamide 66, polyamide 610, polyamide 612, polyamide 6I, polyamide 6T, polyamide 69, and copolymers thereof. Still more preferably, the second layer comprises: (a) polyamide 6 in an amount of from about 40 to 90 weight percent, based on the weight of the second layer; and (b) copolyamide 6/12 in an amount of from about 10 to 60 weight percent, based on the weight of the second layer, wherein the copolyamide 6/12 comprises caprolactam mer in an amount of from about 30 to 70 weight percent (more preferably, 40 to 60 weight percent).

If the heat-shrinkable multilayer film which is used in accordance with the present invention is made by orienting a tape which is heated over a very short time period, such as a tape heated by infrared radiation, the thickness of the second layer could be as high as 70%, based on the thickness of the multilayer film. However, if the film is heated over a relatively long time period, such as being heated in hot water, the preferred polyamides tend to crystallize to a relatively high level before the orientation step, which produces problems during the orientation step (the rate of crystallization depends on the type of polyamide used). In this latter situation, typically, the greater the thickness of the second layer, the more difficult it is to orient to obtain the resulting multilayer film. This forces a practical limit on the maximum percentage thickness of the second layer (especially when the most preferred polyamides are used), based on the total thickness of the multilayer film. Thus, if hot-water is used as the orientation medium, the second layer of the heat-shrinkable film preferably has a thickness of from about 3 to 50 percent of the total thickness of the multilayer film; more preferably, from about 3 to 30 percent; still more preferably, from about 5 to 20 percent; and yet still more preferably, from about 5 to 15 percent, based on a total thickness of the multi-layer film.

The second layer preferably comprises another polymer which disrupts the crystallinity of the polyamide in the second layer. The composition as disclosed immediately above facilitates orientation of a 'tape' to get the resultant multilayer film. This is especially preferred for orientation out of hot-water.

In FIG. 1, multilayer film 10 further comprises inner layer 16. Inner layer 16 is a "third layer" in a film used in accordance with the present invention; hence, inner layer 16 serves as an $O_2$-barrier layer.

In the present invention, the third film layer serves as an O2-barrier layer, and comprises at least one member selected from the group consisting of ethylene/vinyl alcohol copolymer, polyamide, polyvinylidene chloride, and polyalkylene carbonate; more preferably, at least one member selected from the group consisting of ethylene/vinyl alcohol and polyamide. This $O_2$-barrier layer serves to provide the multilayer film with a layer which is especially impervious to atmospheric oxygen, which results in increasing the shelf life of the packaged product. However, EVOH is the preferred polymer for use in the $O_2$-barrier layer.

Preferably, the O2-barrier layer has a thickness of from about 0.05 to 5 mils; more preferably, from 0.05 to 0.5 mil; yet still more preferably, from 0.1 to 0.3 mil; and even yet still more preferably, from about 0.12 to 0.17 mils.

In FIG. 1, multilayer film 10 further comprises outer layer 18. Outer layer 18 is a "fourth layer" in a film used in accordance with the present invention. In the present invention, the fourth film layer provides the multilayer film with the desired abuse, shrink, and optical characteristics, and preferably comprises a polymer having relatively low cost while providing these characteristics. Preferably, the fourth layer has a thickness of from about 0.1 to 3 mils; more preferably, from 0.2 to 2 mils; still more preferably, from 0.3 to 1.5 mil; and yet still more preferably, from about 0.6 to 1.3 mils.

Preferably, the fourth layer comprises at least one member selected from the group consisting of polyolefin, polyamide, polyester, starch-containing polymer, polystyrene, and polyurethane. More preferably, the fourth layer comprises at least one member selected from the group consisting of polyethylene homopolymer, polyethylene copolymer, polypropylene homopolymer, polypropylene copolymer, polybutene homopolymer, and polybutene copolymer; still more preferably, the fourth layer comprises at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer; yet still more preferably, the fourth layer comprises at least one member selected from the group consisting of ethylene/vinyl acetate copolymer, linear low density polyethylene and high density polyethylene. Preferably, the fourth layer is an outer layer.

In FIG. 1, multilayer film 10 further comprises inner layer 20. Inner layer 20 is a "fifth layer" in a film used in accordance with the present invention.

In the present invention, the fifth layer is between the third layer and the fourth layer and serves as a tie layer. As a general rule, tie layers should have a relatively high degree of compatibility with barrier layers, such as polymerized EVOH, or the polyamide layer, as well as non-barrier layers, such as polymerized ethylene alpha-olefin copolymer. The composition, number, and thickness of tie layers is as known to those of skill in the art. Preferably, the fifth layer has a thickness of from about 0.05 to 2 mils; more preferably, from about 0.05 to 0.5 mil; still more preferably, from about 0.1 to 0.3 mil; and yet still more preferably, from about 0.12 to 0.17 mils. Preferably, the fifth layer comprises at least one member selected from the group consisting of modified ethylene/alpha-olefin copolymer, modified ethylene/unsaturated ester copolymer, modified ethylene/unsaturated acid copolymer; and polyurethane. More preferably, the fifth layer comprises an anhydride-modified polyolefin.

Figure 2:
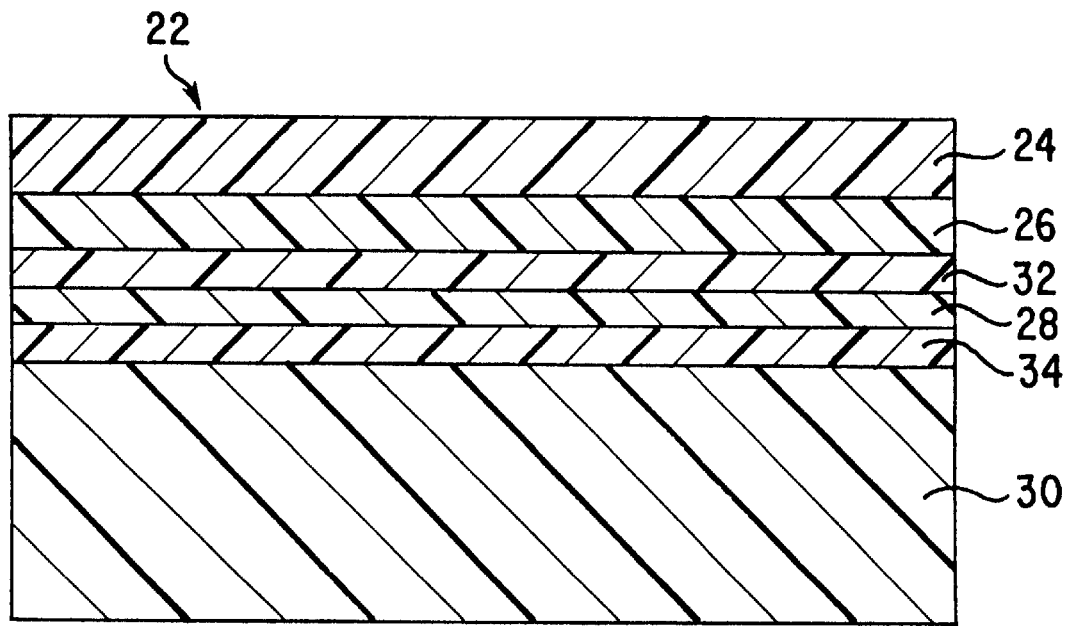
FIG. 2 illustrates an enlarged cross-sectional view of a preferred 6-layer multilayer film suitable for use in the article according to the present invention.
Figure 3:
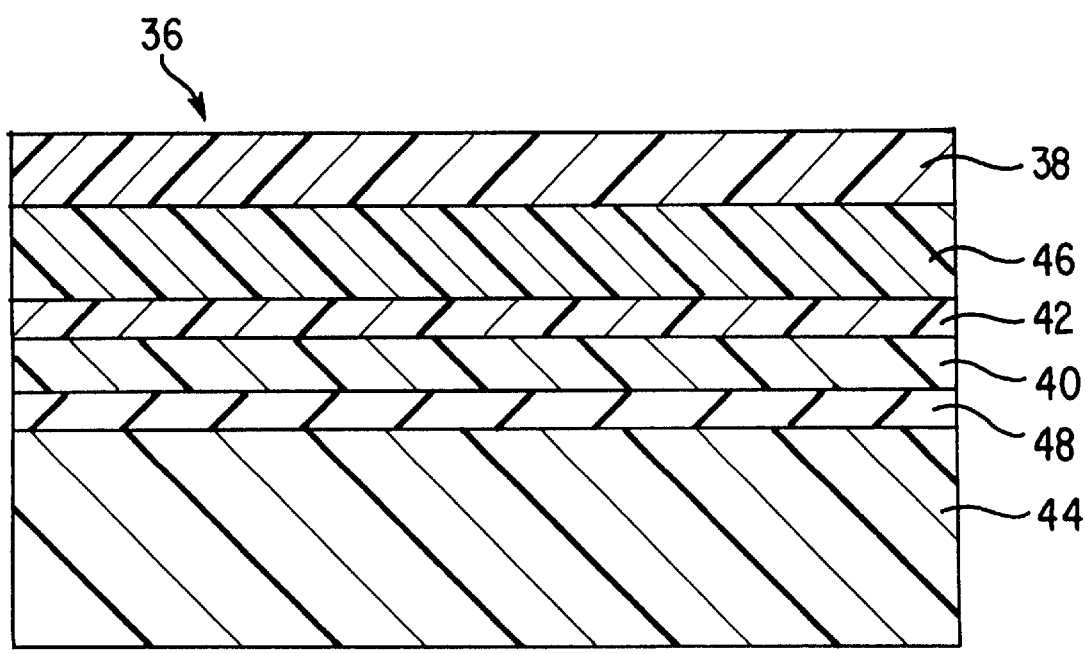
FIG. 3 illustrates an enlarged cross-sectional view of another preferred 6-layer multilayer film suitable for use in the article according to the present invention.

FIGS. 2 and 3 illustrate two alternative preferred embodiments of oriented, heat-shrinkable multilayer films to be used in the article of the present invention. FIGS. 2 and 3 each illustrate six-layer films. These two films are especially suited for conversion to heat-shrinkable bags for the packaging of meat products, in accordance with the present invention.

In FIG. 2, multilayer film 22 comprises outer layer 24 which serves as a seal layer and is the first film layer, as described above. Inner layer 26 is the second film layer, also as described above. Inner layer 28 serves as an $O_2$-barrier layer, and is the third film layer, as described above. Outer layer 30 provides the multilayer film with the desired abuse, shrink, and optical characteristics, and is the fourth film layer, as described above. Inner layer 32 is between second layer 26 and third layer 28; inner layer 32 serves as a tie layer, and is the fifth film layer, as described above. Multilayer film 22 further comprises inner layer 34, which is between third layer 28 and fourth layer 30; inner layer 34 serves as a tie layer and is the sixth film layer.

In the present invention, the sixth film layer is between the first layer and the third layer and also serves as a tie-layer. Preferably, the sixth layer has a thickness of from about 0.05 to 2 mils; more preferably, from about 0.1 to 1 mil; still more preferably, from about 0.2 to 0.8 mil; and yet still more preferably, from about 0.3 to 0.5 mils.

Preferably, the sixth layer comprises at least one member selected from the group consisting of modified ethylene/alpha-olefin copolymer, modified ethylene/unsaturated ester copolymer, modified ethylene/unsaturated acid copolymer; and polyurethane. More preferably, the sixth layer comprises an anhydride-modified polyolefin.

FIG. 3 illustrates alternative 6-layer multilayer film 36 to be used in the article of the present invention. Multilayer film 36 comprises outer layer 38, which serves as a food-contact and seal layer, and is the first film layer. Inner layer 40 is the second film layer. Inner layer 42 serves as the O2-barrier layer, and is the third film layer. Outer film layer 44 provides the multilayer film with the desired abuse, shrink, and optical characteristics, and is the fourth film layer, as described above. Inner film layer 46 is between first film layer 38 and third film layer 42; inner layer 46 serves as a tie layer, and is the sixth film layer, as described above. Inner film layer 48 is between second film layer 40 and fourth film layer 44; inner layer 48 serves as a tie layer, and is the fifth film layer, as described above.

Figure 4:
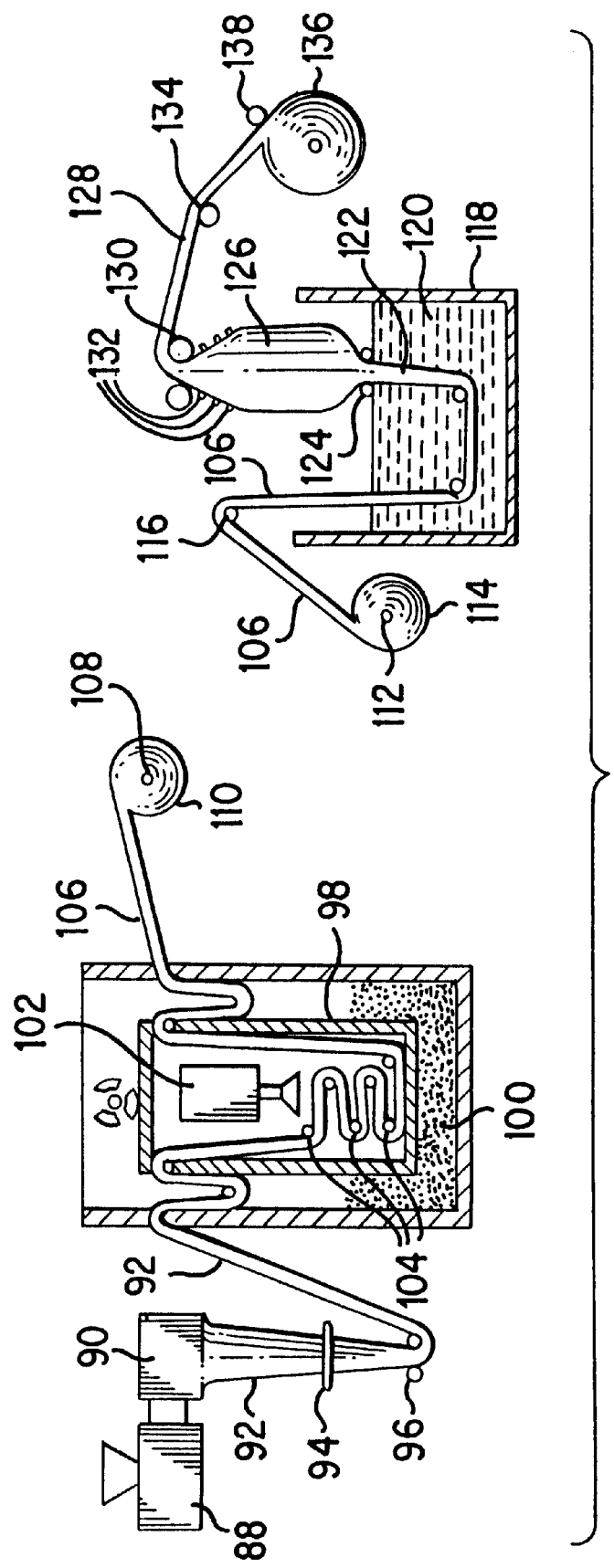
FIG. 4 illustrates a schematic view of a process for making a preferred heat-shrinkable multilayer film for use in the article according to the present invention.

FIG. 4 illustrates a preferred process for making casing film and/or butt-seal tape film for in accordance with the present invention. For example, FIG. 4 illustrates a preferred process for making the films illustrated in FIGS. 1, 2, and 3. In the process illustrated in FIG. 4, solid polymer beads (not illustrated) are fed to a plurality of extruders (for simplicity, only extruder 88 is illustrated). Inside extruders 88, the polymer beads are degassed, following which the resulting bubble-free melt is forwarded into die head 90, and extruded through an annular die, resulting in tubing tape 92 which is preferably from about 15 to 30 mils thick, and preferably has a lay-flat width of from about 2 to 10 inches.

After cooling or quenching by water spray from cooling ring 94, tubing tape 92 is collapsed by pinch rolls 96, and is thereafter fed through irradiation vault 98 surrounded by shielding 100, where tubing 92 is irradiated with high energy electrons (i.e., ionizing radiation) from iron core transformer accelerator 102. Tubing tape 92 is guided through irradiation vault 98 on rolls 104. Preferably, tubing tape 92 is irradiated to a level of from about 40–100 kGy, resulting in irradiated tubing tape 106. Irradiated tubing tape 106 is wound upon windup roll 108 upon emergence from irradiation vault 98, forming irradiated tubing tape coil 110.

After irradiation and windup, windup roll 108 and irradiated tubing tape coil 110 are removed and installed as unwind roll 112 and unwind tubing tape coil 114, on a second stage in the process of making the film as ultimately desired. Irradiated tubing 106, being unwound from unwind tubing tape coil 114, is then passed over guide roll 116, after which irradiated tubing 106 is passed through hot water bath tank 118 containing hot water 120. Irradiated tubing 106 is then immersed in hot water 120 (preferably having a temperature of about 185–210° F.) for a period of about 20–60, i.e., for a time period long enough to bring the film up to the desired temperature for biaxial orientation. Thereafter, hot, irradiated tubular tape 122 is directed through nip rolls 124, and bubble 126 is blown, thereby transversely stretching hot, irradiated tubular tape 122 so that an oriented film tube 128 is formed. Furthermore, while being blown, i.e., transversely stretched, nip rolls 130 have a surface speed higher than the surface speed of nip rolls 124, thereby resulting in longitudinal orientation. As a result of the transverse stretching and longitudinal drawing, oriented film tube 128 is produced, this blown tubing preferably having been both stretched in a ratio of from about 1:1.5 to 1:6, and drawn in a ratio of from about 1:1.5 to 1:6. More preferably, the stretching and drawing are each performed at a ratio of from about 1:2 to 1:4. The result is a biaxial orientation of from about 1:2.25 to 1:36, more preferably, 1:4 to 1:16. While bubble 126 is maintained between pinch rolls 124 and 130, oriented film tube 128 is collapsed by rollers 132, and thereafter conveyed through pinch rolls 130 and across guide roll 134, and then rolled onto wind-up roll 136. Idler roll 138 assures a good wind-up. The resulting multilayer film can be used to form backseamed casings, etc., which, in turn, can be used for the packaging of meat products, in accordance with the present invention.

The films in the examples set forth below were prepared according to the process described immediately above. These examples provide additional details on the multilayer films and the good performance of the multilayer films during a sealing and cooking process.

The polymer components used to fabricate the multilayer film according to the present invention may also contain appropriate amounts of additives typically included in such compositions. These additives include slip agents such as talc, antioxidants, fillers, dyes, pigments, radiation stabilizers, antistatic agents, elastomers, and like additives known to those of skill in the art of packaging films.

The multilayer films according to the present invention can be prepared by any means known to those of skill in the art, e.g., via coextrusion and/or extrusion coating, and/or lamination. However, preferably the films are produced by coextrusion.

The multilayer film according to the present invention preferably has a free shrink of from about 5–70 percent in one or both directions (i.e longitudinal direction "L", also referred to as "machine direction", and transverse direction, "T", at 185° F., determined according to ASTM D 2732–83, which is hereby incorporated, in its entirety, by reference thereto); more preferably, from about 10–50 percent at 185° F.; still more preferably, from about 15–35 percent at 185° F. Preferably, the multilayer film is biaxially oriented.

In another preferred embodiment, the multilayer film may be oriented and then heatset or annealed. In this preferred embodiment, the multilayer film according to the present invention preferably has a transverse direction free shrink of about 0 to 20% at 185° F.; more preferably, from about 2 to 10 percent.

Preferably, the multilayer film has a shrink tension in at least one direction of at least about 10 psi, more preferably, from about 20–1000 psi, still more preferably, from about 100 to 600 psi; and yet still more preferably, from about 250 to 450 psi. Even more preferably, the multilayer film according to the present invention has a longitudinal shrink tension of at least 275 psi at 185° F.; more preferably, at least 300 psi at 185° F. Certain packaging operations involve the use of a heat-shrinkable bag to package and cook a turkey product. In these applications, it is often desirable to obtain a product after cooking which has a profile similar to a turkey-breast. In these applications it may be desirable to obtain a high a level of shrink tension in order to achieve the proper shape. Preferably, the multilayer shrinkable film used in these applications has a shrink tension (in at least one direction) of at least 150 psi, more preferably, at least 200 psi, even more preferably, at least 250 psi, still more preferably, at least 275 psi, and yet still more preferably, at least 300 psi. The presence of the second layer of the multilayer film according to the present invention helps provide the multilayer shrink film with the desired shrink and shrink tension characteristics in order to achieve the proper product profile after cooking.

The multilayer films according to the present invention preferably comprise a crosslinked polymer network. Although the crosslinked polymer network can be produced in one or more of a variety of manners, such as chemical crosslinking and/or irradiation, preferably the crosslinked polymer network is produced by the irradiation of a tape or film. Either some or all of the layers of the multilayer film can comprise crosslinked polymer networks.

In the irradiation process, the film is subjected to an energetic radiation treatment, such as high energy electron treatment, which induces cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. A suitable radiation dosage of high energy electrons is in the range of up to about 16–166 kGy, more preferably about 44–139 kGy, and still more preferably, 80–120 kGy. Preferably, irradiation is carried out by an electron accelerator and the dosage level is determined by standard dosimetry methods.

Figure 5:
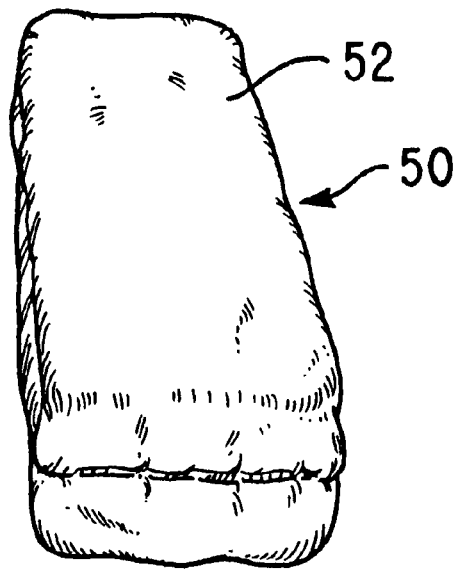
FIG. 5 illustrates a perspective view of a packaged cooked meat product according to the present invention.

FIG. 5 illustrates a packaged cooked meat product 50, according to the present invention. The product, a cooked meat product, is packaged in a heat-sealed, heat-shrinkable bag, within which the meat product has been cooked. The package comprises multilayer film 52, which can be, for example, multilayer film 10 illustrated in FIG. 1, or multilayer film 22 illustrated in FIG. 2, or multilayer film 36 illustrated in FIG. 3, all of which are discussed in detail above. In FIG. 5, the cooked meat product preferably comprises pork, in the form of a boneless ham.

Figure 6:
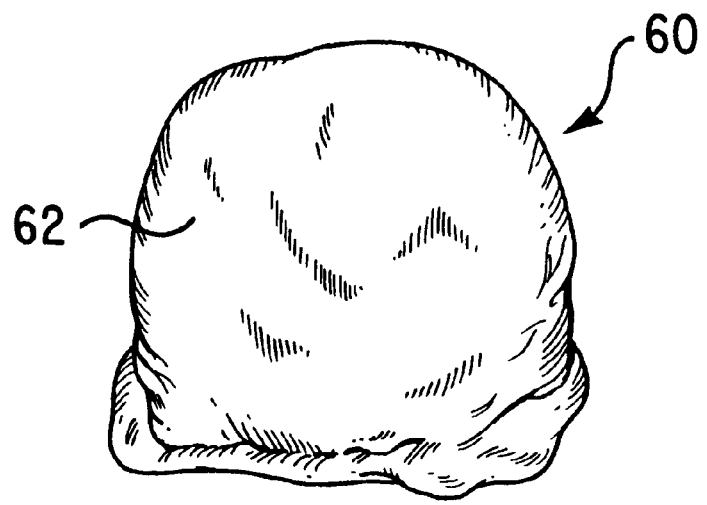
FIG. 6 illustrates a perspective view of a packaged cooked meat product according to the present invention.

FIG. 6 illustrates yet another embodiment of a packaged cooked meat product 60, according to the present invention. The product, a cooked meat product, is packaged in a heat-sealed, thermoformed web having a lidstock web sealed thereto, with the meat product being cooked within the sealed thermoformed package. The package comprises multilayer film 62, which can be, for example, multilayer film 10 illustrated in FIG. 1, or multilayer film 22 illustrated in FIG. 2, or multilayer film 36 illustrated in FIG. 3, all of which are discussed in detail above. In FIG. 6, the cooked meat product preferably comprises ham.

The packaged product can be made by a process comprising: (A) filling an article with a meat product; (B) closing the open end of the filled article (the article being a bag, casing, pouch, etc.) so that the meat product is encased by the closed article; and (C) cooking the meat product encased in the closed article by subjecting the meat to cook-in, so that the meat product adheres to the inside surface of the closed article. The article is an article according to the present invention, preferably a preferred article according to the present invention.

Although in general the product in the package can be any cooked meat product, preferably the cooked meat product comprises at least one member selected from the group consisting of poultry, ham, beef, lamb, goat, horse, fish, liver sausage, mortadella, and bologna; more preferably, poultry, ham, beef and bologna; even more preferably, poultry, ham and roast beef The invention is illustrated by the following examples, which are provided for the purpose of representation, and are not to be construed as limiting the scope of the invention. Unless stated otherwise, all percentages, parts, etc. are by weight.

EXAMPLE 1

A 3⅛ inch wide (lay flat dimension) tube, called a "tape", was produced by the coextrusion process described above and illustrated in FIG. 4, wherein the tape cross-section (from inside of tube to outside of tube) was as follows:

TABLE 1

| LAYER COMPOSITION | LAYER THICKNESS (mils) |
|---|---|
| 50/50 blend of Nylon #1 and Nylon #2 (inside layer of tubular tape) | 1.9 |
| 80/20 blend of anhydride grafted LLDPE#1 and EAO#1 | 3.2 |
| anhydride grafted LLDPE#1 | 1.2 |
| EVOH | 1.2 |
| 50/50 blend of Nylon#3 and Nylon #2 | 2.0 |
| anhydride grafted LLDPE#1 | 1.5 |
| 80/20 blend of EVA#1 and LLDPE#2 (outside layer of tubular tape) | 7.3 | wherein:

NYLON#1 was VESTAMID (™) Z7319 polyamide 12, obtained from Huls America, Inc., of Piscataway, N.J.;

NYLON#2 was GRILON® CF6S polyamide 6/12, obtained from EMS-American Grilon Inc., of Sumter, S.C.;

LLDPE#1 was TYMOR® 1203 linear low density polyethylene having an anhydride functionality grafted thereon, obtained from Morton International, of Chicago, Ill.;

EAO#1 was EXACT 4011 (™) homogeneous ethylene/alpha-olefin copolymer, obtained from the Exxon Chemical Company, of Baytown, Tex.;

EVOH was EVAL® LC-E105A polymerized ethylene vinyl alcohol, obtained from Eval Company of America, of Lisle, Ill.;

NYLON#3 was ULTRAMID® B4 polyamide 6, obtained from BASF corporation of Parsippany, N.J.;

EVA#1 was PE 5269T (υ) ethylene vinyl acetate copolymer, obtained from Chevron Chemical Company of Houston, Tex.;

LLDPE#2 was DOWLEX® 2045.03 linear low density polyethylene, obtained from Dow Plastics, of Freeport, Tex.;

All the resins were extruded between 380° F. and 530° F., and the die was heated to approximately 420° F. The extruded tape was cooled with water and flattened, the flattened width being 3⅛ inches wide in a lay-flat configuration. The tape was then passed through a scanned beam of an electronic cross-linking unit, where it received a total dosage of 105 kilo Grays (kGy). After irradiation, the flattened tape was passed through hot water for about a third of a minute, the hot water having a temperature of from about 208° F. to 210° F. The resulting heated tape was simultaneously inflated into a bubble and drawn, so that a biaxially oriented film tubing having a lay-flat width of 8 inches and a total thickness of 2.0 mils was produced. The bubble was stable and the optics and appearance of the film were good. The film tubing was determined to have about 15% free shrinkage in the longitudinal direction and 26% free shrinkage in the transverse direction (i.e., for a total shrink of about 41% at 185° F.), when immersed in hot water for about 8 seconds, the hot water being at a temperature of 185° F. i.e., using ASTM method D2732-83.

Bags were made from the oriented tubing under a preferred set of conditions by making a transverse heat seal across the width of the tubing and then severing the tubing parallel to and immediately behind the seal. Several bags were packaged, some containing water as the packaged product, with others containing a mixture of 0.1% mineral oil and 99.9% water as the packaged product. These bags were evaluated for seal strength survivability by cooking at 190° F. for 6 hrs, and were found to have acceptable seal strength.

EXAMPLE 2

A 4¼ inch wide tape was produced in a manner similar to the tape of Example 1. The tape had a tape cross-section (from inside of tube to outside of tube) as follows:

TABLE 2

| LAYER COMPOSITION | LAYER THICKNESS (mils) |
|---|---|
| 50/50 blend of Nylon #1 and Nylon #2 (inside layer of tubular tape) | 1.5 |
| blend of Nylon#3 (80%) and Nylon#2 (20%) | 1.5 |
| anhydride grafted LLDPE#1 | 1.5 |
| EVOH | 1.2 |
| anhydride grafted LLDPE#1 | 1.1 |

TABLE 2-continued

| LAYER COMPOSITION | LAYER THICKNESS (mils) |
|---|---|
| blend of EVA#1 (80%) and HDPE#1 (20%) (outside layer of tubular tape) | 6.5 |

HDPE#1 was FORTIFLEX® J60–500C-147 high density polyethylene, obtained from Solvay Polymers, Inc., Deer Park, Tex.; all other resins were as identified in Example 1 above.

All the resins were extruded between 380° F. and 530° F., and the die was heated to approximately 420° F. The extruded tape was cooled with water and flattened, the flattened width being 4¼ inches wide in a lay-flat configuration. The tape was then passed through a scanned beam of an electronic cross-linking unit, where it received a total dosage of 105 kilo Grays (kGy). After irradiation, the flattened tape was passed through hot water for about a third of a minute, the hot water having a temperature of from about 208° F. to 210° F. The resulting heated tape was simultaneously inflated into a bubble (i.e., stretched) and drawn, so that a biaxially oriented film tubing having a lay-flat width of 11 inches and a total thickness of 2.0 mils was produced. The bubble was stable and the optics and appearance of the film were good.

Bags were made from the oriented tubing under a preferred set of conditions by making a transverse heat seal across the width of the tubing and then severing the tubing parallel to and immediately behind the seal. Several bags were packaged, some containing water as the packaged product, with others containing a mixture of 0.1% mineral oil and 99.9% water as the packaged product. These bags were evaluated for seal strength survivability by cooking at 190° F. for 6 hrs, and were found to have acceptable seal strength.

EXAMPLE 3

A 4¼ inch wide tape was produced in a manner similar to the tape of Example 1. The tape had a tape cross-section (from inside of tube to outside of tube) as follows:

TABLE 3

| LAYER COMPOSITION | LAYER THICKNESS (mils) |
|---|---|
| 50/50 blend of Nylon #1 and Nylon #2 (inside layer of tubular tape) | 2.0 |
| blend of Nylon#3 (80%) and Nylon#2 (20%) | 1.0 |
| anhydride grafted LLDPE#1 | 1.5 |
| EVOH | 1.2 |
| anhydride grafted LLDPE#1 | 1.1 |
| blend of EVA#1 (80%) and HDPE#1 (20%) (outside layer of tubular tape) | 6.5 |

All the resins were as identified in Examples 1 & 2 above. All the resins were extruded between 380° F. and 530° F., and the die was heated to approximately 420° F. The extruded tape was cooled with water and flattened, the flattened width being 4¼ inches wide in a lay-flat configuration. The tape was then passed through a scanned beam of an electronic cross-linking unit, where it received a total dosage of 105 kilo Grays (kGy). After irradiation, the flattened tape was passed through hot water for about a third of a minute, the hot water having a temperature of from about 208° F. to 210° F. The resulting heated tape was simultaneously inflated into a bubble (i.e., stretched) and drawn, so that a biaxially oriented film tubing having a lay-flat width of 11 inches and a total thickness of 2.0 mils was produced. The bubble was stable and the optics and appearance of the film were good.

Bags were made from the oriented tubing under a preferred set of conditions by making a transverse heat seal across the width of the tubing and then severing the tubing parallel to and immediately behind the seal. Several bags were packaged, some containing water as the packaged product, with others containing a mixture of 0.1% mineral oil and 99.9% water as the packaged product. These bags were evaluated for seal strength survivability by cooking at 190° F. for 6 hrs, and were found to have acceptable seal strength.

EXAMPLE 4 (Comparative)

A 4¼ inch wide tape was produced in a manner similar to the tape of Example 1. The tape had a tape cross-section (from inside of tube to outside of tube) as follows:

TABLE 4

| LAYER COMPOSITION | LAYER THICKNESS (mils) |
|---|---|
| 50/50 blend of Nylon #1 and Nylon #2 (inside layer of tubular tape) | 3.5 |
| blend of anhydride grafted LLDPE#1 (80%) and EAO#1 (20%) | 2.3 |
| anhydride grafted LLDPE#1 | 1.6 |
| EVOH | 1.2 |
| anhydride grafted LLDPE#1 | 1.9 |
| blend of EVA#1 (80%) and LLDPE#2 (20%) (outside layer of tubular tape) | 5.5 |

Each of the resins was as identified in Examples 1–3 above. All the resins were extruded at between 380° F. and 530° F., and the die was heated to approximately 420° F. The extruded tape was cooled with water and flattened, the flattened width being 4¼ inches in a lay-flat configuration. The tape was then passed through a scanned beam of an electronic cross-linking unit, where it received a total dosage of 105 kilo Grays (kGy). After irradiation, the flattened tape was passed through hot water for about a third of a minute, the hot water having a temperature of from about 208° F. to 210° F. The resulting heated tape was simultaneously inflated into a bubble (i.e., stretched) and drawn, so that a biaxially oriented film tubing having a lay-flat width of 11 inches and a total thickness of 2.3 mils was produced. The bubble was stable and the optics and appearance of the film were good.

Bags were made from the oriented tubing under a preferred set of conditions by making a transverse heat seal across the width of the tubing and then severing the tubing parallel to and immediately behind the seal. Several bags were packaged, some containing water as the packaged product, with others containing a mixture of 0.1% mineral oil and 99.9% water as the packaged product. These bags were evaluated for seal strength survivability by cooking at 190° F. for 6 hrs, and were found to have acceptable seal strength.

TABLE 5

PHYSICAL PROPERTIES OF EXAMPLES 1–3
AND EXAMPLE 4 (COMPARATIVE)

| Physical Properties | Ex. 1 | Ex. 2 | Ex. 3 | Ex. 4 (comp.) |
|---|---|---|---|---|
| Tensile strength (L) (psi) (T) | 13422 | 10575 | 12136 | 9447 |
|  | 8075 | 9880 | 9259 | 8826 |
| % Elongation (L) at break (T) | 131 | 135 | 152 | 154 |
|  | 110 | 133 | 152 | 137 |
| Modulus (L) (psi) (T) | 78.4 | 81.3 | 91.9 | 57.2 |
|  | 80.9 | 84.6 | 86.8 | 65.8 |
| Shrink Tension (L) @ 185° F. (psi) (T) | 317 | 307 | 295 | 242 |
|  | 358 | 371 | 368 | 388 |
| Shrink Tension (L) @ 205° F. (psi) (T) | 388 | 367 | 335 | 338 |
|  | 372 | 373 | 392 | 386 |
| Free shrink (L) @ 185° F. (%) (T) | 15 | 19 | 17 | 19 |
|  | 26 | 26 | 26 | 32 |
| Free shrink (L) @ 205° F. (%) (T) | 28 | 30 | 29 | 31 |
|  | 39 | 33 | 38 | 43 |

"L" represents the longitudinal direction, and
"T" represents the transverse direction
Free Shrink was measured at various temperatures, determined via ASTM D 2732–83.

As can be seen from Table IV above, the films of Examples 1–3 had higher longitudinal (i.e., machine direction) tensile strength and higher modulus than the film of Example 4 (Comparative). Moreover, while each of the films of Examples 1–3 had a total thickness of only 2.0 mils, the film of Example 4 (Comparative) had a total thickness of 2.3 mils. Thus, it is apparent that even though the films of Examples 1–3 are thinner than the film of Example 4 (Comparative), they are also significantly stiffer and therefore have better toughness and abuse-resistance characteristics, gauge for gauge, than the film of Example 4 (Comparative). Furthermore, if the film of Example 4 (Comparative) is thinned down from 2.3 mils to 2.0 mils, i.e., so that it is comparable to the films of Examples 1–3 on a same-total-thickness basis, the abuse resistance of such a comparative 2.0 mil film would be still less than the abuse-resistance of the 2.3 mil film of Example 4 (Comparative), and even further below the abuse-resistance of the 2.0 mil films of Examples 1.3.

Figure 7:
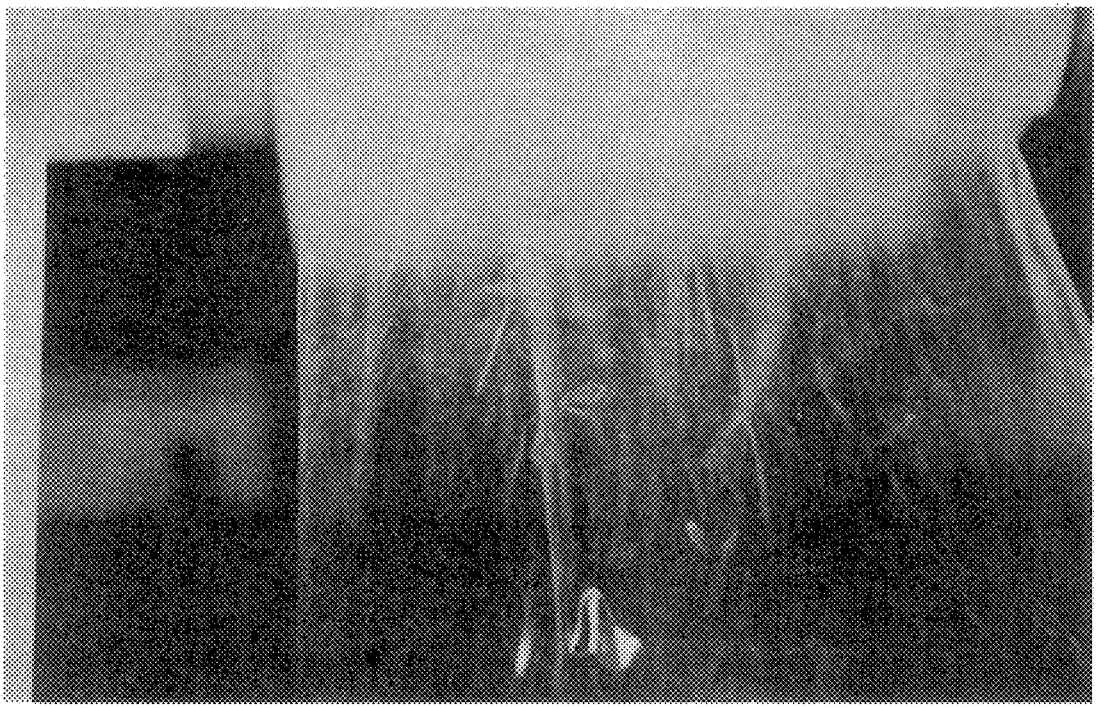
FIG. 7 is a photograph of a wrinkled, creased comparative film.
Figure 8:
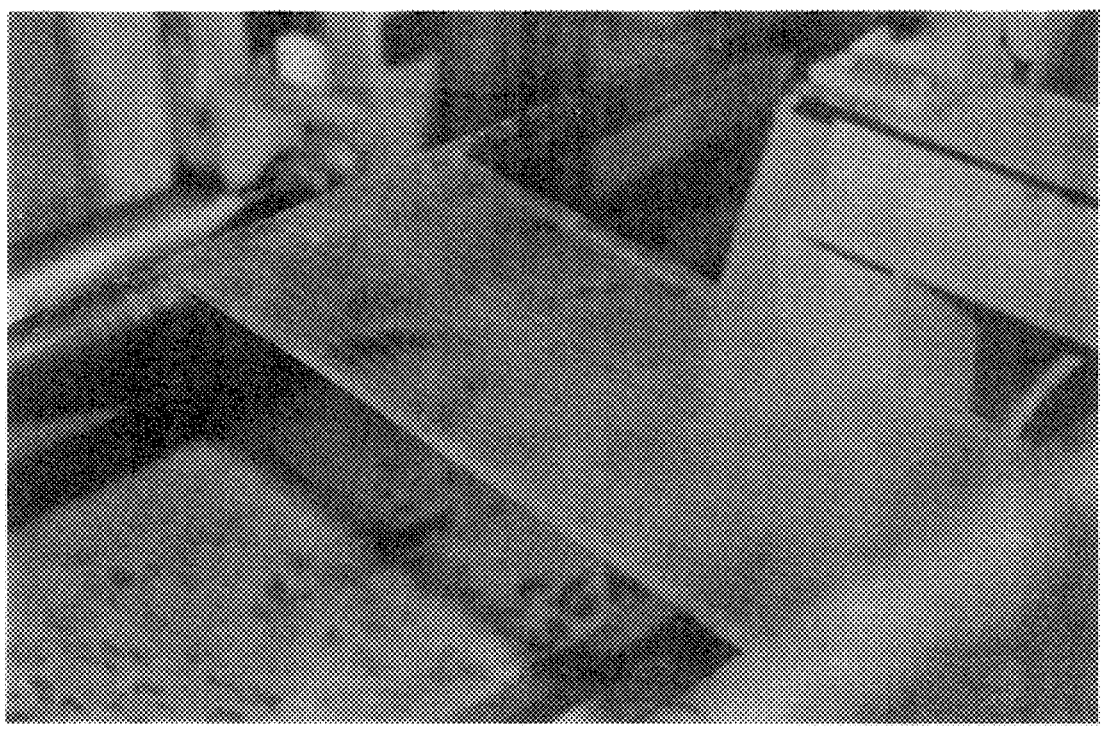
FIG. 8 is a photograph of a non-wrinkled, non-creased film to be used in the article according to the present invention, i.e., a smooth film.

Moreover, it was unexpectedly found that the films of Examples 1–3 did not exhibit wrinkling and creasing, as is typically present in films containing a relatively high percentage of polyamide 6, i.e., at least 30 weight percent polyamide 6, based on total film weight. Wrinkles and creases are undesirable in the films to be used in the article of the present invention, for two reasons. First, if a heat seal is made through a wrinkle or crease, the strength of the seal in the resulting article is considered to be unacceptable because of the increased likelihood that by sealing through the crease, the seal will fail during the cook-in process. Second, if a film is printed as typically happens in a preferred embodiment of the present invention, the wrinkle or crease can lead to poor printability. FIG. 7 is a photographic illustration of a comparative film with wrinkles and creases, which is to be contrasted with FIG. 8, which illustrates a wrinkle-free and crease-free film which can be used in the article according to the present invention.

It is also surprising that during heat sealing the inner polyamide layer(s) permit heat transfer therethrough so the relatively high melting point polyamide in the sealing layer could be effectively sealed, i.e., without burn-through and while producing a strong seal capable of surviving cook-in. This surprising result is associated with the discovery that during heat sealing, films comprising a relatively high amount of polyamide 6, i.e, films containing at least 30 weight percent polyamide 6 based on total film weight, interfered with heat transfer through to the seal layer. The high polyamide content (especially polyamide 6) has been discovered to require the use of a higher sealing temperature, and/or longer sealing time, which unfortunately often leads to burn-through of the film, especially because the outer film layer of the more preferred films are primarily polyolefinic. However, films to be used in the article of the present invention, as typified in Examples 1–3, have a relatively thin nylon layer to facilitate heat-transfer to the sealing layer, while still enhancing the physical properties and seal strength, without wrinkling and creasing.

The relatively thin polyamide core layer in the film used in the article of the present invention also provides the advantage of ease of orientability, relative to comparative films having relatively thicker inner polyamide layers.

The thickness of a film seal layer has a significant influence on seal strength obtainable with the film. That is, a seal layer which is relatively thick (e.g., 0.5 mil) tends to provide a stronger seal than a sealant layer which is relatively thin (e.g., 0.2 mil). The thickness of the seal layer of the films of Examples 1–3 was 0.21 mil, 0.22 mil, and 0.29 mil, respectively, whereas the thickness of the seal layer of the film of Example 4 (Comparative) was 0.50 mils. However, it was apparent that even upon substantial down-gauging of the thickness of the seal layer (and the overall film thickness), the films of Examples 1–3 exhibited a seal survivability under cook-in conditions which was comparable to the film of Example 4 (Comparative). This is also surprising and unexpected in view of the fact that the seal layer thickness for the film of Example 4 (Comparative) was from about 160% to 240% of the thickness of the seal layer of the films of Examples 1, 2, and 3.

Moreover, since the resins in the nylon core layer can be selected from relatively inexpensive nylons (e.g., nylon 6, nylon 66, and nylon 6/66), i.e., relative to the nylons in the seal layer, the overall raw material cost of the film can be substantially reduced. In fact, the overall raw material cost of the film of Examples 1–3 can be up to about 50% less than the film of Example 4 (Comparative), while maintaining comparable performance characteristics.

Although the present invention has been described with reference to the preferred embodiments, it is to be understood that modifications and variations of the invention exist without departing from the principles and scope of the invention, as those skilled in the art will readily understand. Accordingly, such modifications are in accordance with the claims set forth below.

What is claimed is:

1. An article comprising a seamless, tubular multilayer film comprising:
   (A) a first layer comprising a polyamide having a melting point of from about 250° F. to 400° F., the first layer having a thickness of less than about 18 percent, based on a total thickness of the multilayer film;
   (B) a second layer which is an inner layer comprising at least one member selected from the group consisting of polyamide 6, polyamide 9, polyamide 10, polyamide 11, polyamide 12, polyamide 66, polyamide 610, polyamide 612, polyamide 6I, polyamide 6T, polyamide 69, and copolymers thereof, the second layer having a thickness of from about 3 to 30 percent of the total thickness of the multilayer film; and
   (C) a third layer which serves as an $O_2$-barrier layer and comprises at least one member selected from the group consisting of ethylene/vinyl alcohol copolymer, and polyvinylidene chloride; and wherein the first layer comprises a different polymeric composition from the second layer, and the first layer is sealed to itself in a transverse seal across the tubing, and the multilayer film has a free shrink, at 185° F., of from about 5 to 70 percent in each of the longitudinal and transverse directions.

2. The article according to claim 1, wherein the second layer is directly adhered to the first layer.

3. The article according to claim 1, wherein the second layer comprises at least one member selected from the group consisting of polyamide 6, polyamide 66, and polyamide 6/66.

4. The article according to claim 3, wherein the polyamide in the first layer has a melting point of from about 275° to 375° F.

5. The article according to claim 4, wherein the first layer comprises only one polyamide.

6. The article according to claim 4, wherein the first layer comprises copolyamide 6/12 in an amount of from about 20 to 80 weight percent, and polyamide 12 in an amount of from about 80 to 20 weight percent.

7. The article according to claim 6, wherein the first layer has a thickness of less than about 15 percent, based on a total thickness of the multilayer film.

8. The article according to claim 6, wherein the thickness of the first layer is from about 0.2 to 0.4 mil.

9. The article according to claim 3, wherein the second layer comprises polyamide 6 and at least one member selected from the group consisting of polyamide 9, polyamide 10, polyamide 11, polyamide 12, polyamide 66, polyamide 610, polyamide 612, polyamide 6I, polyamide 6T, polyamide 69, and copolyamides thereof.

10. The article according to claim 9, wherein the second layer comprises polyamide 6 in an amount of from about 40 to 90 weight percent, and polyamide 6/12 in an amount of from about 10 to 60 weight percent.

11. The article according to claim 3, wherein the thickness of the second layer is from about 3 to 20 percent, based on a total thickness of the multilayer film.

12. The article according to claim 11, wherein the thickness of the second layer is from about 3 to 15 percent, based on a total thickness of the multilayer film.

13. The article according to claim 3, further comprising a fourth layer comprising at least one member selected from the group consisting of polyolefin, polyamide, polyester, starch-containing polymer, polystyrene, and polyurethane.

14. The article according to claim 13, wherein the fourth layer comprises at least one member selected from the group consisting of polyethylene homopolymer, polyethylene copolymer, polypropylene homopolymer, polypropylene copolymer, polybutene homopolymer, and polybutene copolymer, and the fourth layer is an outer layer.

15. The article according to claim 14, further comprising a fifth layer between the third layer and the fourth layer, the fifth layer serving as a tie-layer.

16. The article according to claim 15, further comprising a sixth layer between the first layer and the third layer, the sixth layer serving as a tie-layer.

17. The article according to claim 16, wherein the multilayer film has biaxial orientation.

18. The article according to claim 16, wherein the multilayer film has a free shrink, at 185° F., of at least 10 percent in at least one direction.

19. The article according to claim 18, wherein at least a portion of the film comprises a cross-linked polymer network.

20. A bag comprising a seamless, tubular multilayer film comprising:

(A) a first layer which is an outer layer sealed to itself in a transverse seal across the tubing and which serves as a food contact and seal layer, the first layer comprising a polyamide having a melting point of from about 250° F. to 400° F., the first layer having a thickness of less than about 18 percent, based on a total thickness of the multilayer film;

(B) a second layer which is an inner layer comprising at least one member selected from the group consisting of polyamide 6, polyamide 9, polyamide 10, polyamide 11, polyamide 12, polyamide 66, polyamide 610, polyamide 612, polyamide 6I, polyamide 6T, polyamide 69, and copolymers thereof, the second layer having a thickness of from about 3 to 30 percent of the total thickness of the multilayer film; and (C) a third layer which serves as an $O_2$-barrier layer and comprises at least one member selected from the group consisting of ethylene/vinyl alcohol copolymer, and polyvinylidene chloride; and wherein the first layer comprises a different polymeric composition from the second layer, and the multilayer film has a free shrink, at 185° F., of from about 5 to 70 percent in each of the longitudinal and transverse directions.

21. The bag according to claim 20, wherein the bag is an end-seal bag.

22. A packaged product comprising:

(A) a package comprising a seamless, tubular multilayer film comprising:

(i) a first layer which is an inside layer sealed to itself in a transverse seal across the tubing and which serves as a food contact and seal layer, the first layer comprising a polyamide having a melting point of from about 250° F. to 400° F., the first layer having a thickness of less than about 18 percent, based on a total thickness of the multilayer film;

(ii) a second layer which is an inner layer comprising at least one member selected from the group consisting of polyamide 6, polyamide 9, polyamide 10, polyamide 11, polyamide 12, polyamide 66, polyamide 610, polyamide 612, polyamide 6I, polyamide 6T, polyamide 69, and copolymers thereof, the second layer having a thickness of from about 3 to 30 percent of the total thickness of the multilayer film; and (iii) a third layer which serves as an $O_2$-barrier layer and comprises at least one member selected from the group consisting of ethylene/vinyl alcohol copolymer, and polyvinylidene chloride; and wherein the first layer comprises a different polymeric composition from the second layer, and the multilayer film has a free shrink, at 185° F., of from about 5 to 70 percent in each of the longitudinal and transverse directions; and (B) a product comprising cooked meat.

23. The packaged product according to claim 22, wherein the cooked meat product comprises at least one member selected from the group consisting of poultry, ham, roast beef, liver sausage, mortadella, bologna, goat, and lamb.

24. The packaged product according to claim 23, wherein the cooked meat product comprises at least one member selected from the group consisting of poultry, ham, and roast beef.

25. The article according to claim 1, wherein the second layer comprises at least one member selected from the group consisting of polyamide 6, polyamide 9, polyamide 10, polyamide 11, polyamide 12, polyamide 66, polyamide 610, polyamide 612, polyamide 6I, polyamide 6T, polyamide 69.

26. The article according to claim 1, wherein the second layer comprises polyamide homopolymer.

27. The article according to claim 26, wherein the second layer further comprises polyamide copolymer.

28. The article according to claim 1, wherein the first layer comprises a polyamide homopolymer having a melting point of from about 250° F. to 400° F.

29. The article according to claim 28, wherein the first layer comprises copolyamide 6/12 in an amount of from about 20 to 80 weight percent, and polyamide 12 in an amount of from about 80 to 20 weight percent.

30. The article according to claim 1, wherein the multilayer film further comprises a fourth layer, which is a second outer layer.

31. The article according to claim 29, wherein the fourth layer comprises at least one member selected from the group consisting of polyolefin, polyester, starch-containing polymer, polystyrene, and polyurethane.

* * * * *